Sept. 18, 1951     J. D. CRECCA ET AL     2,568,222
PORTABLE END WELDING DEVICE

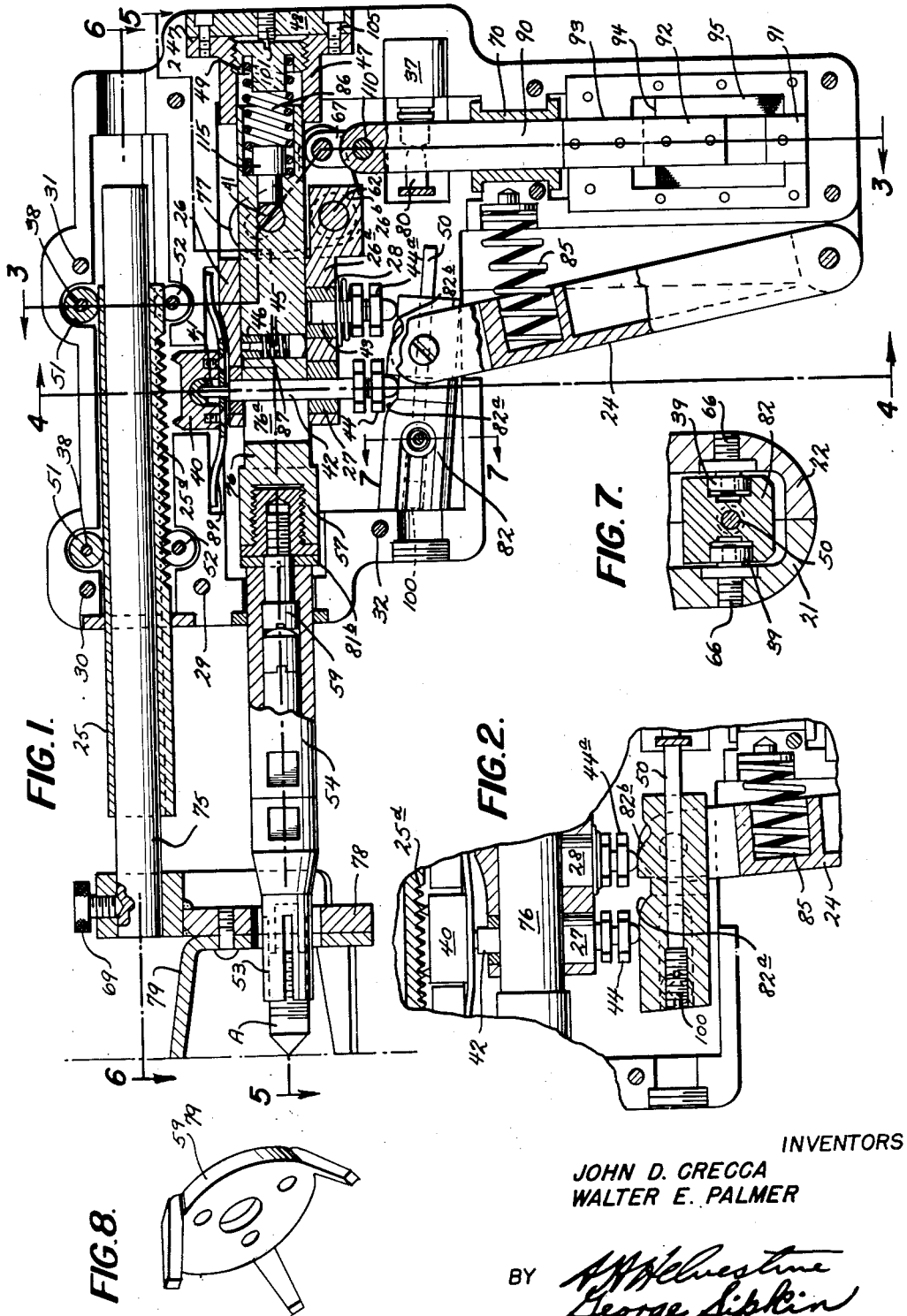

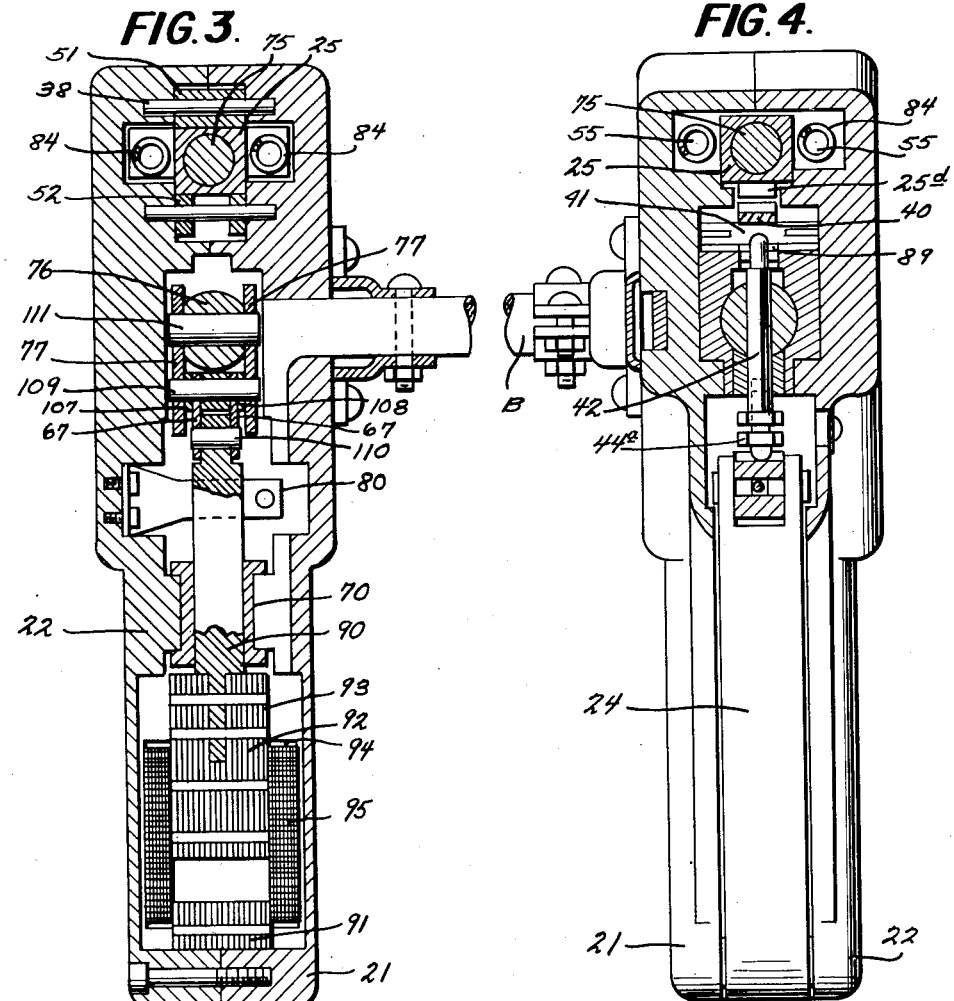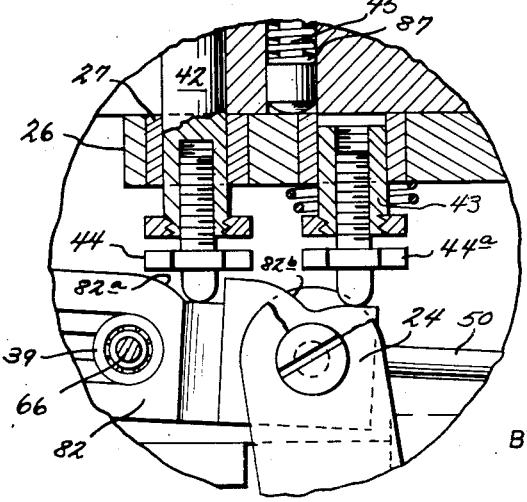

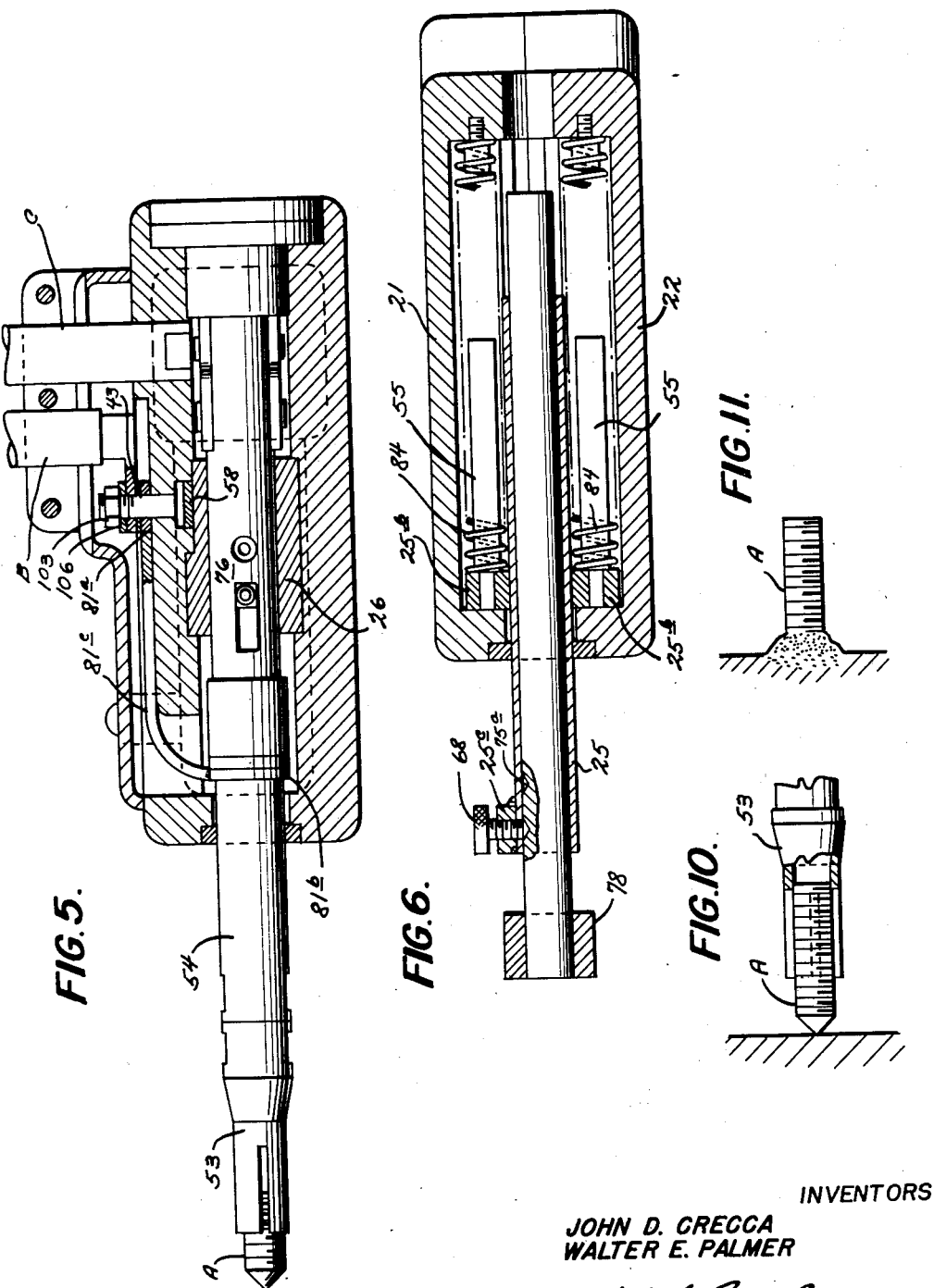

Filed Feb. 19, 1951     4 Sheets-Sheet 4

INVENTORS
JOHN D. CRECCA
WALTER E. PALMER

BY
ATTORNEYS

Patented Sept. 18, 1951

2,568,222

UNITED STATES PATENT OFFICE 2,568,222

PORTABLE END WELDING DEVICE

John D. Crecca, Elizabeth, and Walter E. Palmer, Cresskill, N. J.

Application February 19, 1951, Serial No. 211,628

4 Claims. (Cl. 219—4)

This invention relates to arc welding equipment and more particularly to devices known in the art as "stud welding guns" which may be used to butt weld studs, bolts and the like to the surface of a metallic plate.

The general object of the invention is to provide a "gun" type device to accomplish that type of welding.

It is also an object of the invention to provide a "gun" type welding device which is very compact in the arrangement of parts.

It is a further object of the invention to provide a "gun" type welding device which is relatively light in weight and therefore easily handled and operated.

Other objectives will be apparent from the following description of the device and from the drawings which are merely illustrative of a preferred embodiment of said device and are not to be taken as limitative thereto beyond the scope as defined in the herewith appended claims.

In these drawings:

Fig. 1 is a longitudinal vertical sectional-elevational view taken along a plane passing centrally through the device;

Fig. 2 is an enlarged sectional-elevational view showing the trigger, cam and switch adjustor at the time of contact of the switch adjustor with the push button of the control switch;

Fig. 3 is a transverse vertical sectional view taken along line 3—3 of Fig. 1 looking in the direction indicated by the arrows;

Fig. 4 is a transverse vertical sectional-elevational view taken along line 4—4 of Fig. 1, looking in the direction indicated by the arrows;

Fig. 5 is a horizontal sectional view taken along line 5—5 of Fig. 1 looking in the direction indicated by the arrows;

Fig. 6 is a horizontal sectional view taken along line 6—6 of Fig. 1 looking in the direction indicated by the arrows;

Fig. 7 is a transverse vertical sectional view taken along line 7—7 of Fig. 1 looking in the direction indicated by the arrows;

Fig. 8 is a perspective detail of the supporting tripod;

Fig. 9 is an enlarged sectional-elevational detail view showing the construction and arrangement of the cam (operated by the trigger) and the associated followers;

Fig. 10 is a sectional-elevational view showing the stud in contact with the plate to which it is to be welded at the start of the welding operation;

Fig. 11 is a sectional-elevational view showing the stud as having been moved into the molten puddle at the finish of the welding operation.

Figure 12:
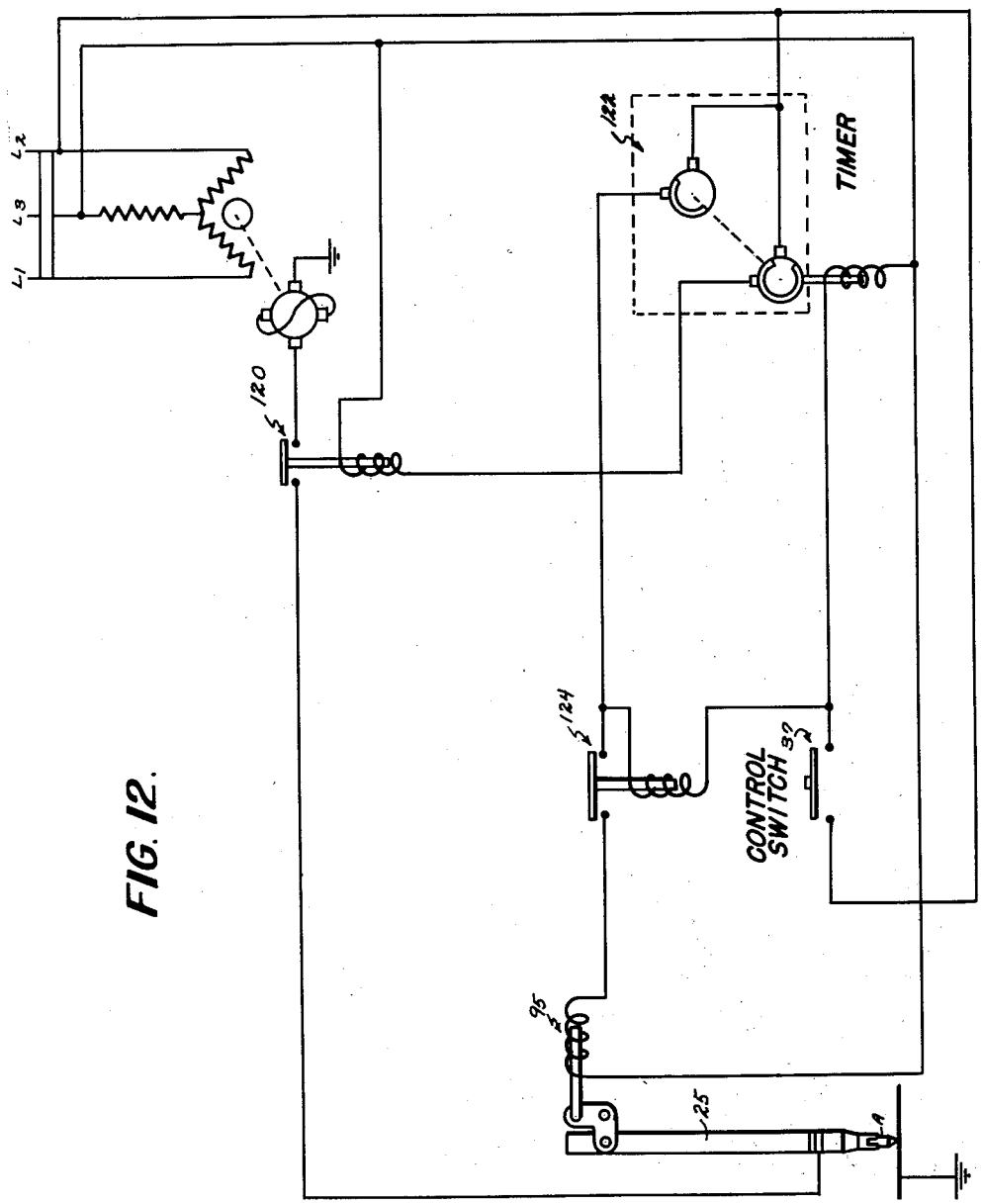
Fig. 12 is a schematic diagram of the electric circuits and controls therein as used in the inventors' device.

The device as illustrated in these drawings, consists essentially of the following assemblage of parts:

a. Gun stock or holder.
b. Positioning and supporting mechanism.
c. Stud holder and activator assembly.
d. Trigger and actuating cam.
e. Solenoid actuated mechanism.

The gun stock or holder consists of pieces 21 and 22. These pieces are made of insulating materials, such as wood, Bakelite, hard rubber, plastic, etc., to avoid shorting the electrical circuits in the gun. Pieces 21 and 22 are milled out to make recesses to receive the various parts of the device housed within these pieces. The parts are first assembled into piece 21 and piece 22 is then assembled with piece 21 by use of locating or dowel pins 29 and piece 22 is attached and secured to piece 21 by cap screws 30, 31, 32. Thus a clamping effect is produced between pieces 21 and 22 holding the numerous parts of the device in their respective recesses. Since in the operation of the gun pieces 21 and 22 act as one piece, these two pieces are referred to below as "gunstock 21—22."

The positioning and supporting mechanism consists of the following: Tripod 79 is attached by removable means to positioner bracket piece 78. When the device is used for end-welding studs to a metal surface thru holes in a sheathing covering the metal surface, tripod 79 is omitted and the device rests with piece 78 directly on the sheathing over the hole. Piece 78 is attached to adjustor shaft 75 by thumb screw 69. Adjustor shaft 75 fits neatly inside of positioner piece 25. Adjustor piece 75 can be adjusted to various positions in piece 25 and secured therein in the desired position by the use of thumb screw 68 which threads thru a lug 25C on piece 25 and the rotation of thumb screw 68 sets the point of its stem into a selected one of the recesses 75A in adjustor shaft 75. This adjustment of piece 75 with respect to piece 25 is to permit use of various lengths of studs and also to allow the stud end to reach the metal surface to which the stud is to be welded when such welding is done with the stud inserted thru holes in various thicknesses of sheathing over the said metal surface and the device is resting with piece 78 on the outer surface of the sheathing.

Piece 25 can move longitudinally inside of gun stock 21—22 between two upper rollers piece 51 (which are held in position with respect to gun-stock 21—22 by pin journals 38) and two pairs of spaced rollers pieces 52 on the under side of piece 25. Each pair of rollers 52 is held in position with respect to gun-stock 21—22 by pin journals. The under side of piece 25 has a longitudinal rectangular projection which extends between each pair of lower rollers 52. The said projection has teeth 25D cut along a portion of its length. These teeth 25D are engaged by the two spaced teeth across the top surface of wedge piece or detent 40 when it is desired to jam the positioning and supporting mechanism, pieces 25, 75, 78 and 79, to any desired position with respect to the gun-stock 21—22 and the stud A. Thus the location of the gun-stock 21—22 and its internal parts and the stud itself with respect to the metal surface can be fixed by the jamming of the teeth on top of wedge 40 against the teeth 25D on piece 25. The space between the teeth on the upper surface of wedge 40 is made so that it is not an exact multiple of the pitch of the teeth 25D on piece 25. This is done to ensure that the jamming of piece 25 with respect to the gun-stock 21—22 will take place at the instant and position desired when wedge 40 is pushed into teeth 25D on piece 25. If the spacing between the teeth on wedge 40 were an exact multiple of the teeth 25D on piece 25, it would be possible for the crests of the teeth on wedge 40 to contact the crests of two of the teeth 25D without any jamming, and jamming of the two pieces 40 and 25 would not occur until piece 25 slid in either direction until the crests of the two teeth on wedge 40 dropped into the roots of the teeth 25D. The spacing of the two teeth on wedge 40 is made so that, when the crest of one of these teeth contacts the crest or to one side of the crest of a tooth 25D, the crest of the other tooth on wedge 40 engages into the root between two teeth of 25D as wedge 40 is pushed toward piece 25. This action will result in the pivoting of wedge 40. To permit such pivoting action the under side of piece 40 is machined to a semicircular surface, which surface rests on wedge pivot piece 41 which in turn fits in a hole transversely across wedge 40. Wedge pivot piece 41 rests on the end of push rod piece 42. Push rod piece 42 serves to push wedge pivot 41 and wedge 40 upward against piece 25 to effect the jamming action mentioned above. Push rod piece 42 is moved upward when the lower rounded end of push rod adjustor piece or cam follower 44, which is attached to piece 42, is moved upward on cam surface 82A when cam piece 82 is moved to the right by trigger piece 24. Wedge 40 is normally held away from piece 25 by the action of leaf spring 89, the middle portion of which is attached to the under side of wedge 40 and the ends of which bear against recessed surfaces in gunstock 21—22.

Screwed into the two lugs 25B of piece 25 are spring guides 55 which act as guides for springs 84. These springs keep pressure against piece 25 and thus against tripod 79 thru the series of connected pieces 75, 69 and 78. The spring pressure on tripod 79 acts as a steadying means when holding the device by manual gripping of the gun-stock 21—22 against the surface to which the stud is to be end welded.

It will be noted that while piece 75 can be positioned in exact increments with respect to piece 25 to allow for known thicknesses of sheathing over the metal surface and to allow for appreciable variations in lengths of studs, the movement of piece 25 between the rollers 51 and 52 provides for unknown variations in the depth of buckles and hollows in the surface of the metal under the sheathing at the situs of weld.

Stud holder and activator assembly

Stud A is held in one end of metal collet or chuck piece 53. The other end of collet 53 is screwed into one end of metal shaft extender piece 54. Shaft extender piece 54 may be made in suitable length to permit the stud to reach the metal surface to which it is to be welded particularly when such surface is covered with large increments in thicknesses of sheathing or covering and the device is rested on the sheathing and the stud must penetrate a hole in the sheathing to reach the situs of weld. To the other end of piece 54, metal washer 81B is attached by means of lock screw 59 which screws into shaft insulator piece 57 and thus draws piece 57 towards piece 54 with metal washer 81B between pieces 57 and 54 and provides for intimate electrical conducting contact of washer 81B to piece 54. Washer 81B is attached to braided flexible electric conductor 81C, the other end of which holds metal washer 81A. The lug at the end of electric cable B makes metallic connection to metal washer 81A thru metal washer 106 and stud 43 which holds the lug washers 106 and washer 81A in contact by action of nut 103. The stud 43 has a square upset end which bears against a recess in part 21 of the gun-stock 21—22, and is insulated from metal piece 26 by an insulating washer 58. Thus welding current is conducted to the stud A thru cable B, the lug at its end, washers 106, stud 63, washer 81A, braided flexible cable 81C, metal washer 81B shaft extender 54 and collet 53.

Activator shaft 76 has its left end screwed to insulator 57. Shaft 76 rests in and can slide axially in bearing piece 26A. The right end of shaft 76 has compression spring 86 bearing against it and tending to move the shaft 76 and thereby pieces 57, 54, 53 and stud A to the left toward the metal surface to which stud is to be welded. Secured to the right end of shaft 76 is button-stop 115. The right end of stop 115 travels (when shaft 76 moves to the right) thru the gap between itself and the end of the prong on arc adjustor 49. The said gap between pieces 115 and 49 is equal to the sum of the arc gap to be made between the stud end to be welded and the situs of weld plus a "puddle distance." The "puddle distance" is the distance that the stud end to be welded travels into the molten puddle of metal made by the welding arc at the situs of weld. The said puddle distance is traveled after the stud end has been withdrawn from contact with the metal surface, with welding current on, to the right away from the situs of weld for the predetermined arc gap, the arc thereupon struck and held for a predetermined time and the stud end returned automatically thru the distance of the arc gap to the situs of weld where there is still a molten puddle of metal just before or simultaneously with the automatic extinction of the arc by a timing means. The stud at the end of this sequence of time continues to move into the molten puddle until the puddle freezes. This "puddle distance" is usually $\frac{1}{16}''$ to $\frac{1}{8}''$.

Arc adjustor 49 can be moved axially toward or away from piece 115 to set the desired gap by screwing piece 49 in bearing piece 47, which also acts as a bearing and guide for shaft 76. Bearing cap 48 is secured to piece 47 by studs 105 and set screw 101 is used to prevent the movement of arc adjustor piece 49 after its position has been set.

There is an axial slot 76A in activator shaft 76 to permit movement of piece 76 axially with piece 42 passing transversely thru 76.

There is a hole in piece 76 transverse to its longitudinal axis. In this hole, pin guide piece 46 is fitted with a drive fit and inside piece 46, puddling pin 45 slides. Spring 87 bears on a shoulder in piece 46 and against a shoulder of piece 45 so as to keep pressure on piece 45 to move it downward. Thus, when shaft 76 moves to the right carrying piece 45 with it and piece 45 aligns with the hole in housing piece 28, piece 45 is pushed by spring 87 into said hole in piece 28, and bears against the end of push rod 43 in said hole. By such action of piece 45, shaft 76 becomes locked to bearing piece 26A and to gun-stock 21—22, since housing piece 28 is secured to piece 26A and 26A is fixed in recesses in gun-stock 21—22.

Trigger and actuating cam

Cam 82 has a longitudinal slot for part of its length on each of two sides. Cam 82 can pivot and slide right and left on two bearing shaft pieces 66, one of which is located on each side of cam 82, and each of which has a pin projection on one end with a ball bearing 39 extending in and bearing in the above-mentioned slots in the two sides of cam 82. The other end of each of pieces 66 is fixed in the gun-stock 21—22 (see Fig. 7).

Through the longitudinal center of cam 82 is a hole in which switch adjustor rod 50 is screwed so that one end of the rod 50 extends outside of cam 82. Rod 50 is prevented from loosening from the set position by set screw 100.

Cam 82 has two cam surfaces 82A and 82B. When cam 82 moves to the right, cam surface 82A pushes up push rod adjustor 44 which is attached to push rod 42 and the latter by such vertical motion pushes wedge piece 40 and thus forces the two teeth on wedge 40 to engage the teeth 25D on the under side of piece 25. Also, when cam 82 moves to the right, cam surface 82B pushes up rod adjustor 44A which is attached to push rod piece 43 and therefore pushes up push rod 43. The upward movement of rod 43 ejects puddling pin 45 out of the hole in housing 28 when the said pin 45 has been forced into the said hole by the motion of shaft 76 to the right as mentioned above. The ejection of pin 45 out of the hole in piece 28 by push rod 43 allows recoil spring 86 to push shaft 76, its attached pieces 57, 81B, 54 and 53 and the stud A to the left toward the situs of weld.

Cam 82 is pulled to the right by the manual movement of trigger piece 24 which is pinned to the right end of cam 82 and cam 82 is pushed to the left by the action of trigger spring 85 against trigger piece 24 when the manual control of the latter piece is released. The motion of cam 82 to the right also carries rod 50 to the right and the right end of rod 50 pushes switch activator piece 80 which has a knob on one end, which knob pushes the button on control-switch 37 closing this switch. Control-switch 37 is connected to electric conductors in cable C. The control-switch closes an external electric circuit, which energizes the solenoid (pieces 91—95), and also actuates a magnetic switch which closes the welding current circuit thru cable B, the control-switch 37 also starts a timing device which device opens the solenoid circuit and the welding current circuit at the end of a pre-set time for duration of the welding arc at the stud end.

Solenoid actuating mechanism

Pieces 91, 93, 94 and 95 make up the solenoid located in the handle portion of gun-stock 21—22. Piece 92 is the armature of the solenoid connected to one end of plunger piece 90 which bears and slides in bearing piece 70. The other end of piece 90 is connected to one end of each of two links 67 by pin 110. The other end of each of the links 67 is connected to one arm of each of the two L-shaped rocker links or bell cranks 77, which are located one on each side of link 67, by pin 109. Pieces 107 and 108 are spacers between links 67 and 77 in way of their connection as shown. The rocker links 77 are located one on each side of shaft 76 and on each side of lug 26B of bearing piece 26A. The two rocker links 77 pivot from lug 26B on pin 62 which passes thru the vertex of the L of each of the pieces 77. The other arm of each of the links 77 has an elongated hole thru which pin 111 passes to connect these arms of links 77 to shaft 76.

When the solenoid coil 95 is energized, armature 92 and plunger 90 are pulled down thus pulling down links 67 which in turn cause the two L-shaped rocker links 77 to pivot together on pin 62 and the vertical arms of links 77 to pull on shaft 76 to the right through pin 111 and piece 115 which is screwed to shaft 76. The elongated holes in the vertical arms of links 77 permit the circular motion of these links to transmit a straight line motion to shaft 76. When the solenoid is de-energized, spring 86 pushes shaft 76 back to the left and thus reversing the motion of links 77, 67, plunger 90 and armature 92.

Operation

The device is held by the hand gripping gun-stock 21—22 at the handle end, i. e., the portion which contains the solenoid, with the palm of the hand against the right end of the stock and the fingers of the hand just touching the trigger piece 24.

Assume that the device is to rest directly against the metal surface to which the stud A is to be end-welded, in which case the tripod 79 is left on the device as shown. The stud A is fitted into collet 53. The position of adjustor shaft 75 is set in positioner piece 25 to suit the length of the stud A and thumb screw 68 set up to fix the position set.

Bearing cap 48 is removed and arc adjustor 49 is screwed in or out in bearing 47 so that the gap between the end of button stop 115 and the extension on arc adjustor 49 is the desired distance, i. e., the puddle distance plus the arc length desired. This distance is indicated by markings on the back face of adjustor piece 49. Bearing cap is then replaced.

The device is positioned with the tripod 79 on the metal surface to which the stud A is to be end-welded and with the stud tapered end over the situs of weld. The palm of the hand pushes against the right end of the gun-stock 21—22 until the stud end touches the metal surface. In this action, positioner piece 25 moves between rollers 51 and 52 with the lugs 25B on piece 25 compressing springs 84 which compression steadies the movement of the gun-stock 21—22.

Since the stud-end is now against the metal surface, further pressure of the palm of the hand against the right end of gun-stock 21—22 moves the gun-stock 21—22 and its interior parts towards the metal surface with the exception of the stud holder and activator assembly, i. e., the stud A (which is already against the metal surface), pieces 53, 54, 81B, 57 and 86. Thus there is a relative movement between these pieces with respect to the gun-stock 21—22 and bearing piece 26A. This relative movement compresses spring 86 and causes puddling pin 45 to enter into the hole in piece 28 and against the end of push rod 43, because of the action of spring 87. The said relative movement of piece 76 in bearing 26A causes the shank of push rod 42 to move relatively to the left in slot 76A.

When puddling pin 45 enters hole in piece 28 and bears against push rod 43, bearing piece 26A becomes locked with piece 76 and since bearing 26A is fixed and bears against recesses in gun-stock 21—22, the stud holder and activator assembly, pieces A, 53, 54, 81B, 57 and 76 are all locked with the gun-stock 21—22. The shank of push rod 42 is now located in slot 76A with space on each side of it. The space existing on the right side is the "puddle distance" and the space on the left is the arc distance.

During the preceding motions, the fingers of the hand have been held against trigger piece 24 without exerting any pressure. The fingers are now drawn against trigger 24 pulling it towards the right. In so doing, cam piece 82 moves to the right causing cam surface 82A to push rod adjustor 44 and push rod 42 upward. Push rod 42 consequently pushes against wedge pivot 41 and wedge 40; so that the teeth on wedge 40 engage into the roots of teeth 25D on positioner piece 25. This action locks positioner piece 25, shaft 75 and its attached pieces 78 and tripod 79, with the gun-stock 21—22 since push rod 42 is fixed in bearing piece 27 which is fixed in bearing 26A, which, in turn, is fixed in gun-stock 21—22. Therefore, further pressure of the palm of the hand on gun-stock 21—22 causes no more movement of any part and the entire device. The position of the stud, which is bearing against the metal surface, with respect to the tripod and positioner 25 and gun-stock 21—22 is now set.

Conditions are now right for the weld to be made. Further pull on the fingers on trigger 24 draws the latter piece further to the right thus pulling cam 82 to the right more and causing cam surface 82B to push push rod 43 upward. Piece 43 thereupon pushes puddling pin 45 out of hole in piece 28. Though spring 86 has been compressed, as stated above, there is no motion of activator shaft 76 and the rest of the activator assembly to the left since the stud is still bearing against the metal surface.

Further pull on trigger 24 to the right causes cam 82 to move further to the right carrying switch adjustor 50 to the right until the latter piece pushes switch activator 80 which pushes control-switch 37 closed.

Control-switch 37 as shown in Fig. 12 closes an external electric circuit, thru wires in cable C, which circuit actuates a magnetic switch 120, which, in turn, closes the main welding current circuit and electric current passes thru cable B thru pieces 106, 43, 81A, 81C, 81B, 54, 53 to the stud A. Simultaneously, the control-switch closes an external electric circuit which starts a timing device 122 to function. This timing device has already been set for a predetermined duration of the welding arc. The control-switch 37 also at the same time closes an external electric circuit through electro-magnetic switch 124, whose wires pass thru cable C, which energizes solenoid coil 95. The energizing of the solenoid causes the coil armature core 92 to be pulled down, thus pulling plunger 90 and links 67 down. The motion of the links 67 down causes the rotation of rocker links 77 and movement of shaft 76 to the right further compressing spring 86.

The movement of shaft 76 to the right draws the pieces attached to it to the right, i. e., 57, 81B, 54, 53 and the stud A. The movement of the stud A to the right away from the metal surface causes an arc to be struck between the stud-end and the metal surface since welding current has already been imposed on the stud, as mentioned above.

It is to be noted that, since the existing position of cam 82 and cam surface 82A maintains push rod 42 against wedge 40 and the teeth on wedge 40 jam the teeth on piece 25, the tripod 79 and pieces 78, 75, 25 are still locked with the gun-stock 21—22 and thus form a supporting pedestal. Therefore, when the stud was withdrawn from the metal surface to strike the arc, the gun-stock 21—22 maintains its relative position with respect to the metal surface.

The timer mentioned above, on expiration of the period set for the arc duration, opens the magnetic switch in the welding current and the arc is extinguished. Slightly before the extinction of the arc, the arc timer opens the circuit which has energized the solenoid thus de-energizing the solenoid coil 95 and releasing the force pulling shaft 76 against the spring 66. Upon release of the solenoid pull, the spring 86 pushes shaft 76 with its attached pieces 57, 81B, 54, 53 and the stud A to the left and the stud end is projected into the crater of the arc at the situs of weld. The grip on trigger 24 is still held during this time in its previously drawn position to the right so that the still upward position of push rod 43 prevents puddling pin 45 from slipping into the hole in piece 28 as pin 45 travels to the left, carried with shaft 76, past the said hole in piece 28.

Since the solenoid is released slightly before the extinction of the arc, the metal in the crater at the situs of weld is still in a molten or puddled state when the stud end is projected into it by the action of spring 86 on shaft 76. Therefore, the return movement to the left of shaft 76 and its attached pieces, including the stud, is greater than just the arc distance by the amount of the pre-set "puddle distance," which was set when shaft 76 was moved to the right with respect to bearing 26A until puddle pin 45 dropped into the hole in piece 28 in bearing 26A. Consequently, the stud end can immerse itself into the molten or puddled metal deeper than its original position in contact with the metal surface at the situs of weld, and a greater area of fusion between the stud end and the metal surface is realized.

The device is then withdrawn from the metal surface on completion of the weld, the stud sliding out of collet 53.

When the device is used to end-weld a stud to a metal surface thru a hole in a sheathing covering such surface, the tripod 79 is not used, and the flat surface of positioner bracket 78 forms the base for the device against the sheathing. In such case, the adjustor shaft 75 provides for known variation in length of stud by locking shaft 75 in suitable position with respect to piece 25, and positioner piece 25, by virtue of its travel on the roller 51 and 52 takes account of unknown variations in the metal surface under the sheathing. But once the stud has been pushed down to contact such metal surface, the position of the device with respect to the sheathing and metal surface is fixed and locked by the action of trigger 24 pulling cam 82 and cam surface 82A to the right and thus causing push rod 42 to jam the teeth of wedge 40 against the teeth on positioner piece 25.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. Gun type welding apparatus characterized by compactness and relatively light weight adapted for the arc-welding of studs, bolts and the like to the surface of a metallic plate comprising a hollow stock body, a hollow grip handle integral with said hollow stock body and extending at right angles from one end thereof, a positioning plunger rod resiliently mounted in the upper part of said stock body adjustably movable with respect thereto and lockable therein in any one of a plurality of positions, a supporting plate structure adjustably attached to said plunger rod and adapted to contact the surface of said metallic plate around the area to be welded and to thereby position said stock body with respect to the surface of said plate, a second plunger resiliently and movably mounted within said stock body, in parallel with said plunger rod, said second plunger extending exteriorly of said stock body, a chuck piece for holding a stud to be welded in contact with the surface of said plate securely attached to the exterior end of said second plunger, a trigger pivotally mounted on said handle and extending into said stock body, a solenoid coil and armature mounted in said handle, said armature connected by linkwork to said second plunger and adapted to move said second plunger in a direction away from the surface of said plate when said solenoid coil is energized, an electrical control switch positioned in said stock body to be closed by mechanism operated by said trigger, a first train of mechanism in said stock body operable by said trigger to lock said plunger rod with respect to said stock body, a second train of mechanism in said stock body operable by said trigger to release said second plunger to be subject to forward biasing by its resilient mounting, an electrical welding circuit including therein the plate and the stud to be welded thereto and an electromagnetically operated switch, a second electrical circuit connected to said solenoid coil and including an electro-magnetically operated switch therein and a timer operatively in circuit with said control switch and with said electromagnetic switches whereby upon closing of said control switch the said timer for a predetermined period of time closes the electromagnetically operated switches in the welding and solenoid circuits thereby feeding welding current through said stud and plate and substantially simultaneously withdrawing said stud from the surface of said plate a distance sufficient to strike an arc therebetween and whereby upon opening of said circuits by said timer the solenoid is de-energized, the welding current is cut off and the stud is moved forward into the puddle of molten metal formed between the stud and the surface of said plate.

2. The positioning pluger rod resiliently mounted in said stock body as defined in claim 1 comprising a cylindrical rod, a sleeve rectangular in cross-section, slidably mounted on aligned roller bearings in said stock body, movably surrounding a portion of said rod, said rod extending forwardly from said sleeve, set screw means threadedly engaging said sleeve for positionally fixing said sleeve and rod with respect to each other, a collar fixedly attached to said sleeve within said stock body, at least one stub shaft extending rearwardly from said collar parallel to said sleeve compression spring means, surrounding said stub shaft, bearing on said collar and an abutment in said stock body to bias said sleeve forward, a plurality of teeth arranged in the form of a rack on the underside of said sleeve, wedge detent means controlled by said trigger adapted to engage said teeth to thereby hold said sleeve in fixed relationship with respect to said stock body and a bracket plate support adjustably attached to the forward end of said rod.

3. The first train of mechanism in said stock body operable by said trigger as defined in claim 1 comprising a cam piece mounted on roller bearings in said stock body and pivotally connected to said trigger whereby as said trigger is moved said cam piece follows pivoting about both its roller bearing mounting in said stock body and pivotal connection to said trigger, said cam piece provided with a notched cam surface, a cam follower in contact with said cam surface, a push rod adjustably connected to said follower, a toothed detent freely connected to the outer end of said push rod and spring means connected to said detent to bias said detent and push rod toward said cam surface.

4. The solenoid coil and armature mounted in the handle of said gum and the link-work operatively connecting said armature to said second plunger as defined in claim 1 comprising a wire coil wound around a hollow spool positioned in the lower part of said handle, a fixed core extending into the field of said coil, an armature, movable with respect to said coil, extending into the field thereof, a plunger rod slidably mounted in a bearing in said handle and securely connected to said armature, a pair of links pivotally connected to the end of said plunger rod, a pair of bell cranks pivotally mounted in said stock body, one of the arms of said pair of bell cranks pivotally connected to said pair of links and the other arms of said pair of bell cranks pivotally and slidably connected to said second plunger, an electric circuit including a control switch in said stock body connected to said solenoid coil whereby when said solenoid coil is energized upon closing said switch said armature is drawn into the field thereof and said second plunger and stud are moved a predetermined distance away from said plate.

JOHN D. CRECCA.
WALTER E. PALMER.

No references cited.